(12) United States Patent
Lu

(10) Patent No.: US 7,690,084 B2
(45) Date of Patent: Apr. 6, 2010

(54) STRUCTURE OF ANTI-VIBRATING ROTATION SHAFT

(75) Inventor: Chin Chuan Lu, Sinjhuang (TW)

(73) Assignee: Jarllytec Co., Ltd., Taipei County (TW)

( * ) Notice: Subject to any disclaimer, the term of this patent is extended or adjusted under 35 U.S.C. 154(b) by 83 days.

(21) Appl. No.: 12/123,256

(22) Filed: May 19, 2008

(65) Prior Publication Data

US 2009/0011840 A1 Jan. 8, 2009

(30) Foreign Application Priority Data

Jun. 1, 2007 (TW) .............................. 96209027 U

(51) Int. Cl.
*E05D 5/02* (2006.01)

(52) U.S. Cl. ...................... 16/387; 16/382; 361/679.27; 464/180

(58) Field of Classification Search ................... 16/387, 16/380, 381, 274, 382; 379/433.13; 455/575.3; 361/679.27; 248/921–923; 464/7, 180, 184
See application file for complete search history.

(56) References Cited

U.S. PATENT DOCUMENTS

| | | | |
|---|---|---|---|
| 6,657,856 B1 | 12/2003 | Lu | |
| 6,748,625 B2 * | 6/2004 | Lu | ............................... 16/285 |
| 6,986,188 B2 * | 1/2006 | Lu et al. | ........................ 16/330 |
| 2006/0288535 A1 * | 12/2006 | Lu et al. | ........................ 16/387 |
| 2008/0312001 A1 * | 12/2008 | Lee et al. | .................... 464/180 |
| 2009/0007376 A1 * | 1/2009 | Lin | ............................. 16/263 |
| 2009/0049649 A1 * | 2/2009 | Lin | ............................. 16/387 |

FOREIGN PATENT DOCUMENTS

TW 545618 8/2003

* cited by examiner

*Primary Examiner*—William L. Miller
(74) *Attorney, Agent, or Firm*—Guice Patents PLLC

(57) ABSTRACT

The present invention provides a supporting rack, one lateral end thereof is provided with a connecting section and the base thereof is provided with an extending section, at least one clamping ring is formed at the free end of the extending section and an opening is provided between the clamping ring and the extending section; an auxiliary connecting member used to connect a reinforcing sheet to the extending section, a positioning sheet is formed by vertically bending one end of the reinforcing sheet and is formed as one piece with the reinforcing sheet; a core hole is axially provided on the positioning sheet, with respect to a location of a shaft hole of the clamping ring and with respect to a size of a shaft rod; a pivotal shaft, the shaft rod is axially extended from the pivotal shaft; the shaft rod passes through the core hole of the positioning sheet and is tightly connected thereon, and is covered by at least one clamping ring.

8 Claims, 4 Drawing Sheets

STRUCTURE OF ANTI-VIBRATING ROTATION SHAFT

BACKGROUND OF THE INVENTION

1. Field of the Invention

The preset invention relates to a rotation shaft, more particularly to a structure of rotation shaft capable of preventing connected objects, e.g. a display monitor, from vibrating.

2. Description of Related Art

For commercial electronic good, e.g. a portable computer, a mobile phone, an electronic dictionary and a portable audio/video playing device, etc, its main portion is mostly disposed below its cover and a rotation shaft is provided to connected the main portion and the cover, so the cover can be opened or closed, relative to the main portion, therefore the rotation shaft plays an crucial role on determining the quality of the goods mentioned above.

A conventional rotation shaft is mainly composed by a retaining member and a mobile member pivotally connected to the retaining member, and a desired positioning effect is obtained by the friction generated by the two above mentioned members relatively rotating. As shown in FIG. 1, which is a 3D exploded view of a conventional structure of rotation shaft, a lateral connecting section 42 of a main body 41 of the mobile member 40, e.g. a supporting rack, is connected to a long-stripe shaped rack member for connecting to one side of a display screen, and a free end of an extending section 43 disposed below the main body 41 is bended or winded so at least one clamping ring 44 is formed, the clamp rings 44 are mounted and connected by a retaining member 50, e.g. a rotation rod 51 of a pivotal shaft, so a pivotal connection status is formed. When the supporting rack rotates, a friction is generated on a fiction plane between the rotation rod 51 and the clamping rings 44 so a structure of rotation shaft is formed.

Because the clamping rings 44 are formed by bending or winding metals, axial shaft holes 45 thereof are not in a real round shape. When the shaft holes 45 of the clamping ring 44 rotate with the shaft rod 51 of the pivotal shaft as a rotation core, the vibration generated at gaps between the shaft holes 45 and the shaft rod 51 are overly long so wearing of the two members mentioned above are increased and the service life are therefore shortened. The extending section 43 is extended from the main body 41 of the supporting rack and formed as one piece with the main body 41, the thickness of the extending section 43 is not enough so the rigidity thereof is not strong and has flexibility, this also results in the vibration of the display screen is overly long.

Taiwan Patent No. 545618, corresponding to U.S. Pat. No. 6,657,856, entitled "Fixing structure for preventing the screen of notebook computer from bouncing and vibrating" has disclosed a structure formed on a pivotal device of a notebook computer screen and used to prevent vibration when opening the screen, wherein one side of a prime sheet member assembled between the pivotal device and the screen housing is provided with an installation block for supporting sheet, the installation block for supporting sheet of the prime sheet member is provided with a supporting sheet that is vertical to the prime sheet member and capable of contacting with the screen housing, the screen housing is supported by the supporting sheet so the vibration during opening is reduced. The installation block for supporting sheet and the supporting sheet provided by the patent mentioned above are combined in a mounting fashion, so the combination is often unstable or loose which is needed to be improved.

SUMMARY OF THE INVENTION

The applicant of the present invention has, for years, devoted himself to design and commercially distribute rotation shaft, and wishes to overcome problems that gaps are formed when the above mentioned clamping rings of the main body and the shaft rod of the pivotal shaft are connected, and the rigidity of the extending section of the main body is not strong enough which results in the vibration of the object to be connected, e.g. a display screen is overly long. An auxiliary connecting sheet is therefore designed and connected to the extending section of the main body for increasing the rigidity, and a positioning sheet is extended from the lateral end of the auxiliary connecting sheet and formed as one piece with the auxiliary connecting sheet and is adjacently connected to one end of the clamping rings, the shaft rod passes through a pre-set core hole of the auxiliary connecting sheet and is tightly connected thereon for increasing effect of anti-vibrating of the structure of rotation shaft; with time and efforts, the present invention "Structure of anti-vibrating rotation shaft" is provided.

To achieve objects mentioned above, the present invention provides a supporting rack, one lateral end thereof is provided with a connecting section and the base thereof is provided with an extending section, at least one clamping ring is formed at the free end of the extending section and an opening is provided between the clamping ring and the extending section; an auxiliary connecting member used to connect a reinforcing sheet to the extending section, a positioning sheet is formed by vertically bending one end of the reinforcing sheet and is formed as one piece with the reinforcing sheet, a core hole as axially provided on the positioning sheet, with respect to a location of a shaft hole of the clamping ring and with respect to a size of a shaft rod; a pivotal shaft the shaft rod is axially extended from the pivotal shaft; the shaft rod passes through the core hole of the positioning sheet and is tightly connected thereon, and is covered by at least one clamping ring.

Another object of the present invention is to provide a structure of anti-vibrating rotation shaft, wherein two adjacent clamping rings are cut by a rip slot so the two openings between the two adjacent clamping rings and the extending section can be in the same or opposite direction.

One another object of the present invention is to provide a structure of anti-vibrating rotation shaft, wherein the connecting section of the supporting rack has at least one jointing hole, and an engaging section of the pivotal shaft is a face milling column or a polygonal prism.

One another object of the present invention is to provide a structure of anti-vibrating rotation shaft, wherein the reinforcing sheet is connected to the extending section with a riveting fashion; wherein at least one rivet column is formed by punching the reinforcing sheet for mounting into a through hole pre-set on the extending section, then the rivet column is punched by a jig so the rivet column is deformed and fixed on the surface of the extending section; or a rivet is provided to pass through a pre-set hole of the reinforcing sheet and pass through the through hole of the extending section, then the rivet is punched by the jig so the rivet is deformed and fixed on the surface of the extending section.

One another object of the present invention is to provide a structure of anti-vibrating rotation shaft, wherein the reinforcing sheet is connected to the extending section with a fashion of screw-fitting, buckling or adhering.

DETAILED DESCRIPTION OF THE PREFERRED EMBODIMENT

Figure 1:
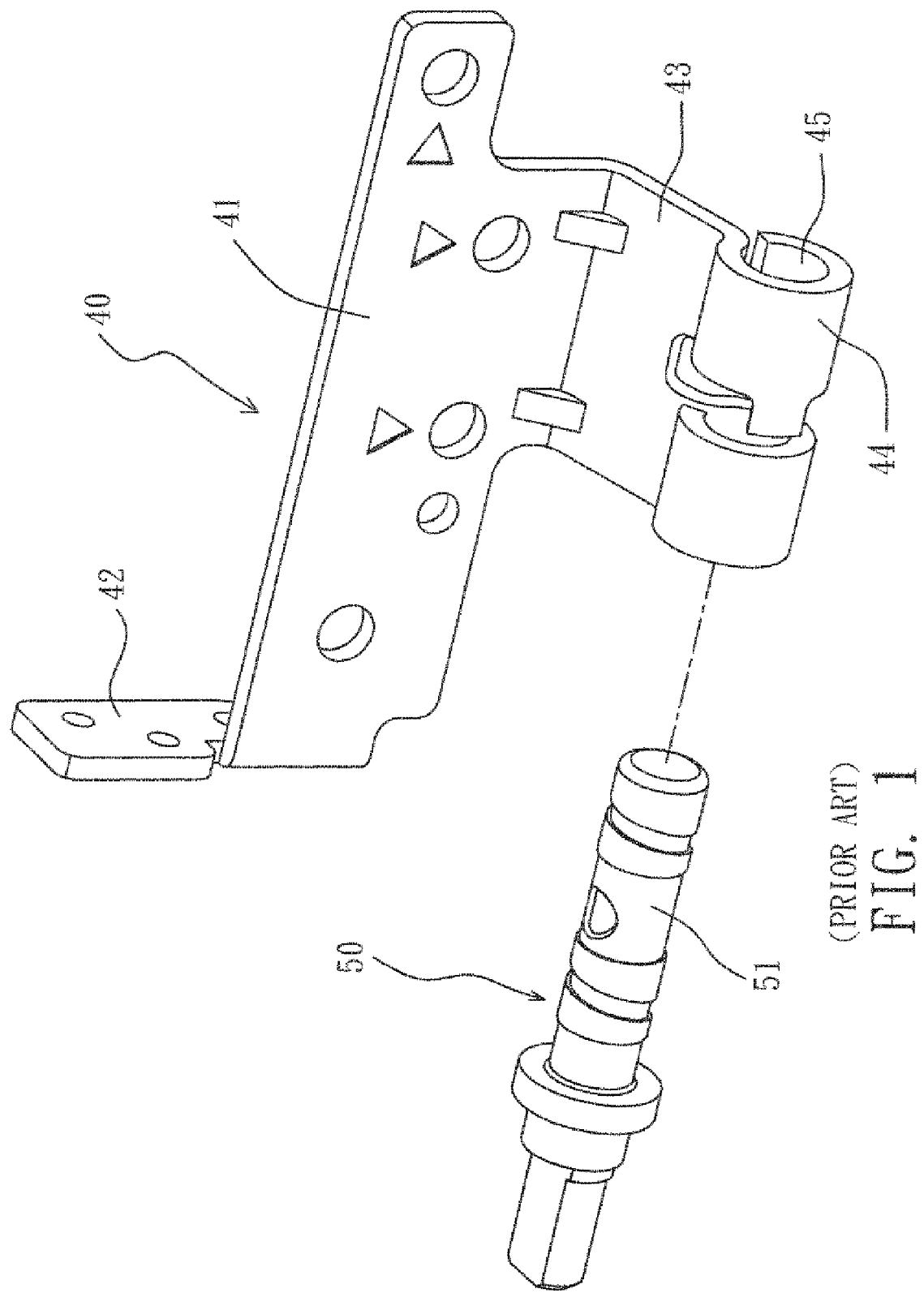
FIG. 1 is a 3D exploded view of a conventional structure of rotation shaft.
Figure 2:
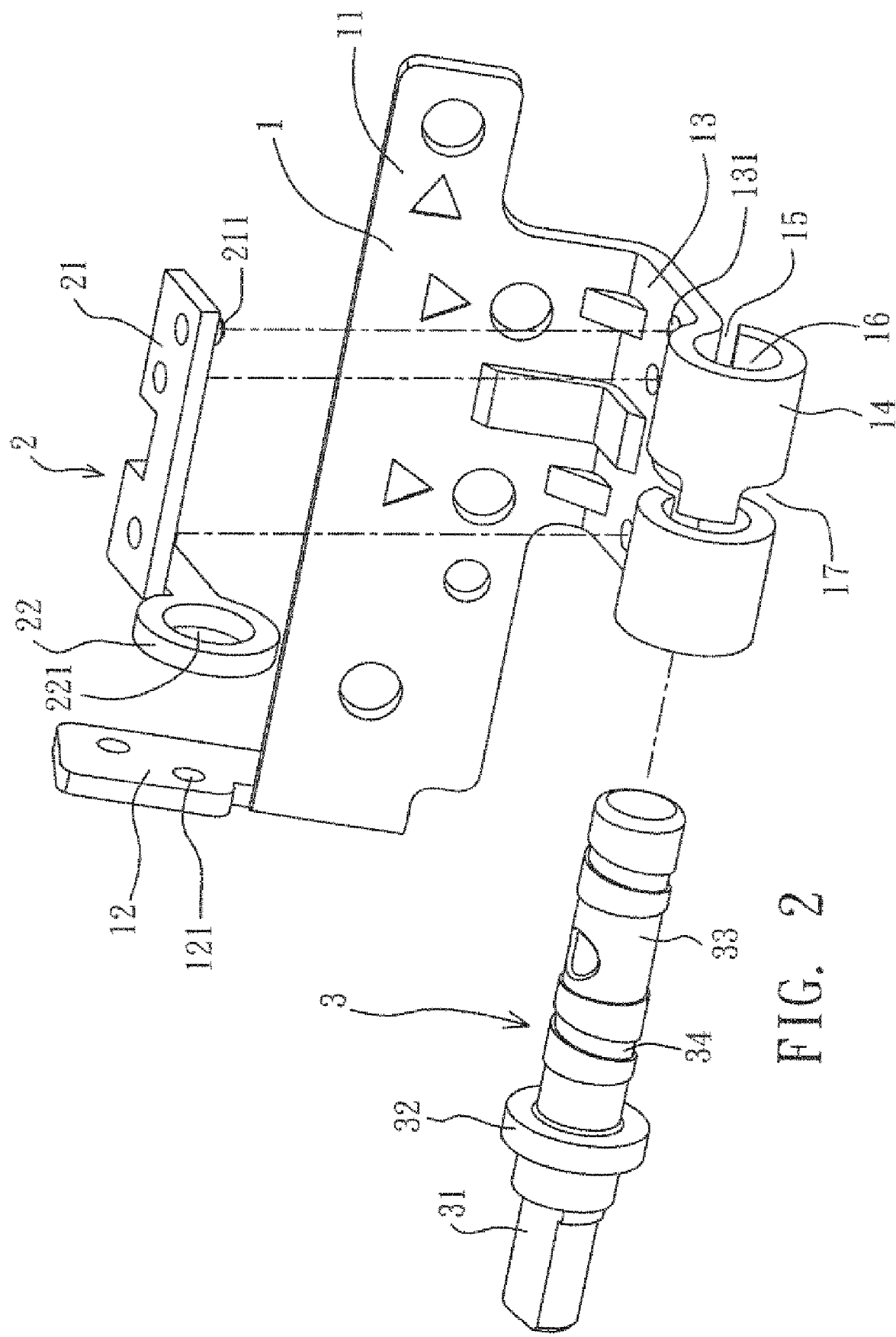
FIG. 2 is a 3D exploded view of a structure of rotation shaft provided by the present invention.
Figure 3:
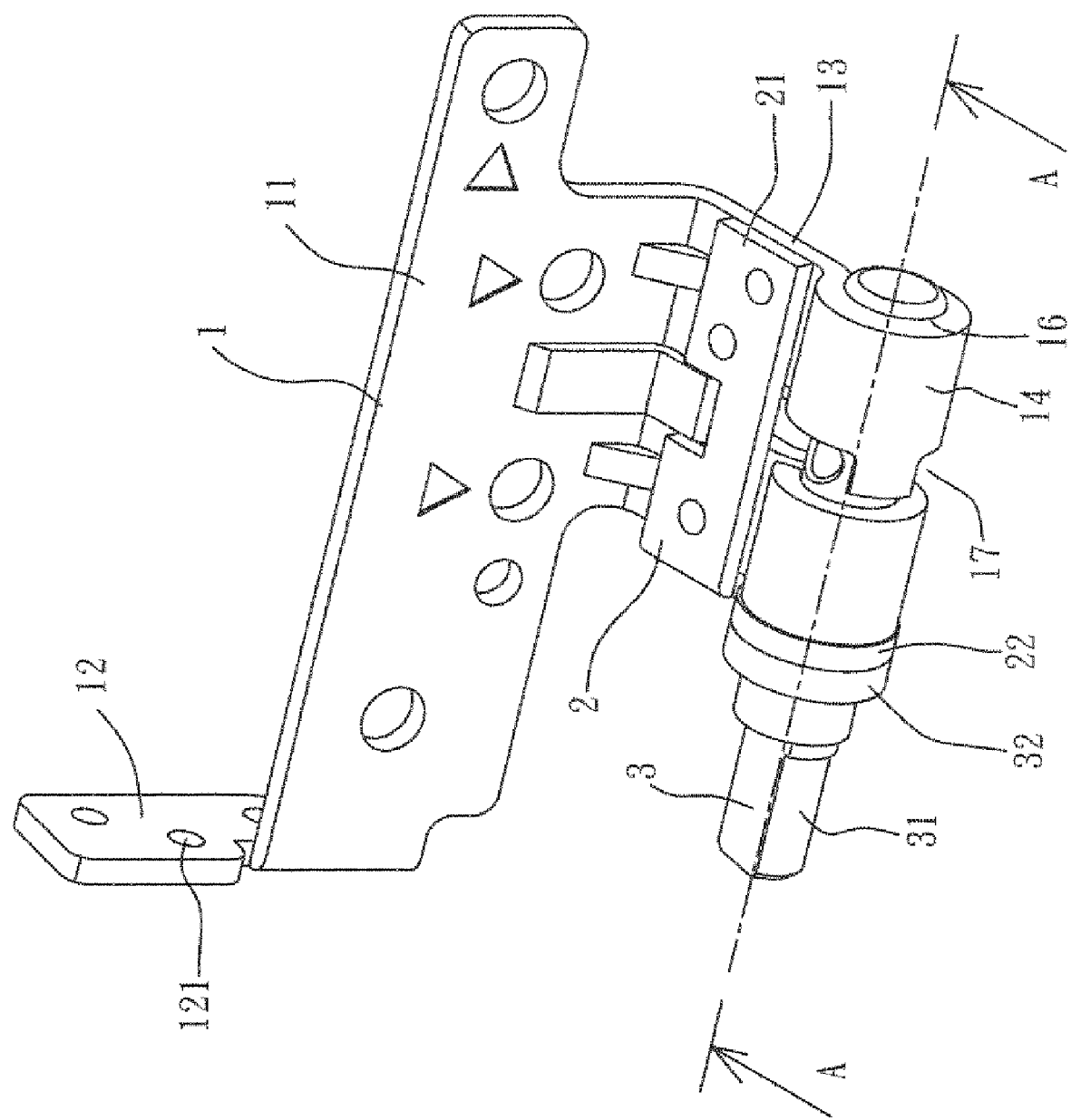
FIG. 3 is a 3D view of the structure of rotation shaft shown in FIG. 2, after assembled.
Figure 4:
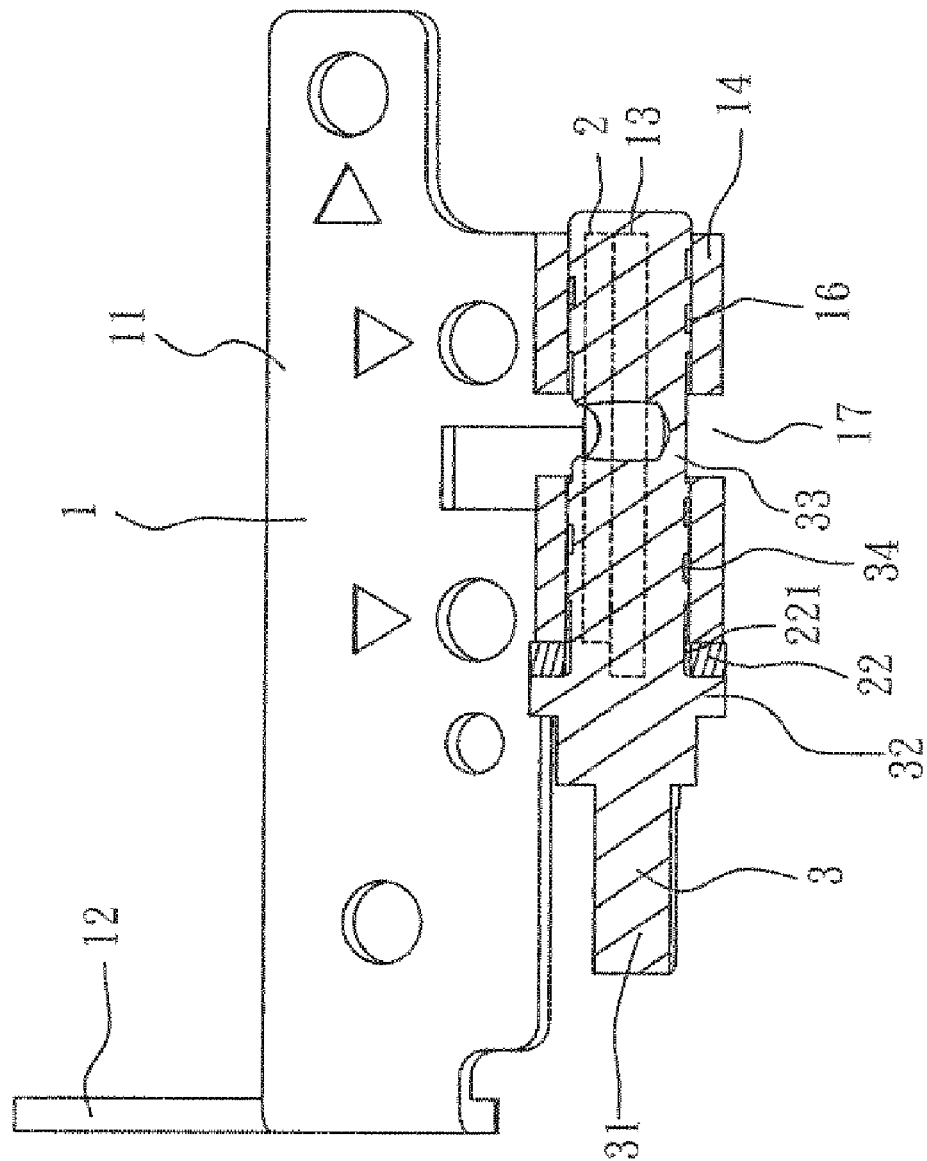
FIG. 4 is a cross-sectional view of FIG. 3 intercepted alongside an A-A line.

As shown in FIG. 2 to FIG. 4, the rotation shaft provided by the present invention is substantially composed by a supporting rack 1, an auxiliary connecting member 2 and a pivotal shaft 3.

The supporting rack 1 is a rack formed by being punched or bended, one lateral side of a main body 11 is longitudinally provided with a connecting section 12 for connecting to an object, e.g. a long-strip shaped rack member, so as to connect to a display screen of a notebook computer; the connecting section 12 is provided with at least one jointing hole 121 so the connecting section 12 can be fixed on the long-stripe shaped rack member by conventional jointing members, e.g. screws. The connecting section 12 can be, but not limited to, a face milling column, a polygonal prism such as a triangle prism or a tetragon prism, so the connecting section 12 can be inserted and positioned in the object.

An extending section 13 is horizontally extended from the base of the main body 11 the free end thereof is bended to a ring shape for forming at least one clamping ring 14, wherein an opening 15 is provided between each clamping ring 14 and the extending section 13, so each shaft hole 16 of each clamping ring 14 is not in a real round shape, for generating a friction with a shaft rod 33. As shown in FIG. 2, two adjacent clamping rings 14 are cut by a rip slot 17, so the two openings 15 between of the two adjacent clamping rings 14 and the extending section 13 can be in the same or opposite direction.

The auxiliary connecting member 2 is connected to the extending section 13 by a reinforcing sheet 21 for increasing the thickness and efficiently increasing the rigidity of the extending section 13. AS shown in FIG. 2, the reinforcing sheet 21 is riveted on the surface of the extending section 13, at least one rivet column 211 is formed by punching the reinforcing sheet 21 for mounting into a through hole 131 pre-set on the extending section 13, then the rivet column 211 is punched by a jig so the rivet column 211 is deformed and fixed on the surface of the extending section 13; the riveting fashion is not limited to that as mentioned above, another fashion in which a rivet is provided to pass through a hole pre-set on the reinforcing sheet 21 and pass through the through hole 131 of the extending section 13, then the rivet is punched by the jig so the rivet is deformed and fixed on the surface of the extending section 13 is also included within the present invention; the connecting fashions of screw-fitting, buckling or adhering between the reinforcing sheet 21 and the extending section 13 are also included within the present invention.

Referring to FIG. 2, a positioning sheet 22 is extended from one lateral end of the reinforcing sheet 21 of the auxiliary connecting member 2 and is formed as one piece with the reinforcing sheet 21, in other words the positioning sheet 22 is formed by punching or bending a metal sheet, the front portion of the positioning sheet 22 is provided with a core hole 221 adjacently connected to a clamping ring 14 and aligned with the shaft hole 16. The inner diameter of the core hole 221 is corresponding to the outer diameter of the shaft rod 33, so the shaft rod 33 passes through the core hole 221 of the positioning sheet 22 and is tightly connected thereon, and the shaft rod 33 is covered by at least one shaft hole 16 of a clamping ring 14; with the effects of position and friction of the core hole 221 to the shaft rod 33, the supporting rack 1 therefore has a function of anti-vibrating.

The pivotal shaft 3 is a rod, one end thereof is provided with an engaging section 31 for engaging to another object, e.g. engaging to a main portion of a notebook computer; the engaging section 31, as shown in figures, of the embodiment provided by the present invention is a face milling column but a polygonal prism such as a triangle prism or a tetragon prism is also applicable, so the engaging section 31 can be inserted and positioned in the another object. The engaging section 31 is provided with at least one jointing hole so the engaging section 31 can be fixed on the another object by conventional jointing members, e.g. screws.

A shaft ring 32 is provided at the substantial middle portion of the pivotal shaft 3. A shaft rod 33 is axially extended from the pivotal shaft 3. A curvy-shaped oil tank 34 is provided on the surface of the pivotal shaft 3 for storing lubricating oil so as to provide lubricating effect.

When assembled, the reinforcing sheet 21 of the auxiliary connecting member 2 is firstly connected to the surface of the extending section 13, so the core hole 221 of the positioning sheet 22 is adjacent to a shaft hole 16 of a clamping ring 14, then the shaft rod 33 of the pivotal shaft 3 passes through the core hole 221 of the positioning sheet 22 and be inserted into at least one clamping ring 14; by fixing the supporting rack 1, the auxiliary connecting member 2 and the pivotal shaft 3, the assembly of the structure of rotation shaft provided by the present invention is completed. When the structure of rotation shaft is connected to a display screen and a main portion of a notebook computer, after the extending section 13 of the main body 11 of the supporting rack 1 is connected to the reinforcing sheet 21, the rigidity is enhanced and the flexibility is reduced, and the shaft rod 33 is tightly connected to the core hole 221 of the positioning sheet 22 so the vibration duration of the structure of rotation shaft is reduced.

In the embodiment of the present invention, a reinforcing sheet is connected to a surface of an extending section of a supporting rack of the structure of rotation shaft, so the thickness of the extending section is increased and the integral rigidity is enhanced; and a shaft rod passes through a core hole of a positioning sheet and is tightly connected thereon, and is covered in at least one clamping ring of the supporting rack, so dual anti-vibrating function is obtained; the auxiliary connecting member provided by the present invention is integrally formed in one piece so problems of unstable or loose possibly caused by two individual members connecting to each other can be overcome.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A structure of anti-vibrating rotation shaft, comprises:

a supporting rack, one lateral end thereof is provided with a connecting section and the base thereof is provided with an extending section, at least one clamping ring formed at a free end of the extending section and having an opening provided between the clamping ring and the extending section;

an auxiliary connecting member having a reinforcing sheet used to connect the auxiliary connecting member to the extending section, a positioning sheet is formed by vertically bending one end of the reinforcing sheet and is formed as one piece with the reinforcing sheet; a core hole is axially provided on the positioning sheet, with respect to a location of a shaft hole of the clamping ring and with respect to a size of a shaft rod;

a pivotal shaft having the shaft rod extending axially; the shaft rod passes through the core hole of the positioning sheet and is tightly connected thereon, and is covered by the at least one clamping ring.

2. The structure of anti-vibrating rotation shaft as claimed in claim 1, wherein the at least one clamping ring is two adjacent clamping rings, the two adjacent clamping rings are located on the free end of the extending section and are cut by a rip slot, each of the two adjacent clamping rings has a free end spaced apart from the extending section, the free end of each of the two adjacent clamping rings are located adjacent to the extending section at a position selected from a group consisting of a same surface of the extending section and opposing surfaces of the extending section.

3. The structure of anti-vibrating rotation shaft as claimed in claim 1, wherein the connecting section of the supporting rack has at least one jointing hole, and an engaging section of the pivotal shaft is selected from a group consisting of a face milling column and a polygonal prism.

4. The structure of anti-vibrating rotation shaft as claimed in claim 1, wherein the reinforcing sheet is connected to the extending section with a rivet.

5. The structure of anti-vibrating rotation shaft as claimed in claim 4, wherein the rivet is at least one rivet column formed by punching the reinforcing sheet for mounting into a through hole pre-set on the extending section, then the at least one rivet column is punched by a jig so the rivet column is deformed and fixed on a surface of the extending section.

6. The structure of anti-vibrating rotation shaft as claimed in claim 4, wherein the rivet is provided to pass through a pre-set hole of the reinforcing sheet and pass through a through hole of the extending section, then the rivet is punched by a jig so the rivet is deformed and fixed on a surface of the extending section.

7. The structure of anti-vibrating rotation shaft as claimed in claim 1, wherein the reinforcing sheet is connected to the extending section by buckling.

8. The structure of anti-vibrating rotation shaft as claimed in claim 1, wherein a surface of the shaft rod is provided a curvy-shaped oil tank.

* * * * *